(12) United States Patent   (10) Patent No.: US 6,237,992 B1
Howard                      (45) Date of Patent: May 29, 2001

(54) PEDESTRIAN SAFETY MODULE DEVICE

(75) Inventor: Mark Shane Howard, Aachen (DE)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/634,777

(22) Filed: Aug. 9, 2000

(30) Foreign Application Priority Data

Aug. 21, 1999 (EP) .................................... 99116470

(51) Int. Cl.⁷ .................................... B62D 25/10
(52) U.S. Cl. .................... 296/194; 296/189; 180/271; 180/69.21
(58) Field of Search .................... 296/194, 189; 180/271, 281, 274, 69.21

(56) References Cited

U.S. PATENT DOCUMENTS 3,709,316 * 1/1973 Glance .
4,753,475 * 6/1988 Mochida .

FOREIGN PATENT DOCUMENTS

| 197 10 417-A1 | 9/1998 | (DE) . |
| 0509690-A1 | 10/1992 | (EP) . |
| 0630801-A1 | 12/1994 | (EP) . |
| 58-221773 | 12/1983 | (JP) . |

* cited by examiner

Primary Examiner—Joseph D. Pape
(74) Attorney, Agent, or Firm—Gary A. Smith

(57) ABSTRACT

A pedestrian safety device for automotive vehicles with a deployable hood consists of a pedestrian safety module beneath the leading edge of the hood, and a hinge assembly at the trailing edge of the hood. The hood is latched to the module. In case of a pedestrian impact at the leading edge of the hood the module is mechanically released to rotate, so that the hood is lowered at the leading edge. Simultaneously the rotational impulse of the hood is used to uplift the trailing edge of the hood. A two bar link at the rear hinge assembly is released by the hood impulse and enables uplifting of the trailing edge of the hood, and locks the hood in a deployed position.

18 Claims, 2 Drawing Sheets

PEDESTRIAN SAFETY MODULE DEVICE

FIELD OF THE INVENTION

The present invention relates to a pedestrian safety device and in particular to a pedestrian safety device for automotive vehicles.

BACKGROUND OF THE INVENTION

In modern motor car design, for visibility, aerodynamic and styling reasons, it is desirable that the hood line is kept as low as possible. As a result, there is generally very little clearance between the hood and the engine bay contents of the automotive vehicle. Consequently, the hood will provide very little cushioning effect when impacted by a pedestrian during an accident. Pedestrian safety performance can be improved by increasing the clearance of the hood. Therefore a device is necessary to raise the hood when impacted by a pedestrian.

EP 0630801 B1 discloses a vehicle hood which is hinged at its leading edge and which is releasable latched at its trailing edge. Both the hinge mechanism and the latch mechanism by which the hood is attached to the vehicle are arranged to cause the whole hood to lift along its full length when the forward edge of the hood is impacted by a pedestrian during an accident. The hinge and latch mechanism disclosed in the above patent specification refer to a hood which is hinged at its leading edge, but it is not applicable to a hood which is hinged at its trailing edge.

Therefore, it is a primary object of the present invention to provide a pedestrian safety device for rearward hinged hoods, with none of the above mentioned drawbacks.

SUMMARY OF THE INVENTION

According to the present invention there is provided a pedestrian safety device for a rearward hinged hood, which will enable the leading edge of the hood to cushion the pedestrian impact while raising the trailing edge of the hood.

In accordance with the present invention a pedestrian safety device includes a hood hinged to the vehicle body by means of a pair of hinge assemblies, said hinge assemblies being located at the trailing edge of the hood. The hinge assemblies lift the hood upward in response to a pedestrian impact and lock the hood in a deployed position, whereby said hood is latched to a safety module at the leading edge of the hood. The safety module comprises an upper front cross-member attached to the body structure by two safety module pivots disposed at its left-hand side and right-hand side. In normal operating conditions rotation of the safety module around a vehicle transverse axis is restrained by two shear pins located at the right-hand side and the left-hand side of the safety module, each between a safety module and vehicle body. Both shear pins are located in front of the safety module pivots relative to the vehicle longitudinal axis. The dimension of a shear pin and the distance of a shear pin to a safety module pivot are arranged such that in case of a pedestrian impact at the leading edge of the hood the shear pins fail at a predetermined load so that the safety module is released to rotate around the vehicle transverse axis.

Bump stops are attached to the pedestrian safety module on its upper side at the rear edge, the bump stops also lie backwards to the safety module pivots in such a way that in case of a pedestrian impact, when the safety module starts to rotate, the rear edge of the module hits the hood and lift it up, while the hood is pushed down by the pedestrian impact force at its leading edge, so that as a result the hood starts to rotate around a vehicle's transverse axis. Thus the leading edge of the hood is lowered during an impact which causes a cushion for the pedestrian during the accident.

The hinge assembly has a lower hinge bar and an upper hinge bar linked together with a safety pivot. Both hinge bars are restrained to rotate about the safety pivot by a shear pin, which is located between both hinge bars in normal operation mode. The hinge bars are released to rotate about the safety pivot in a safety operation mode when said shear pin fail due to an overload during pedestrian impact. Then the trailing edge of the hood can lift upward and the hood is locked by the hinge assembly in a position which is determined by the geometry of the hinge assembly.

DESCRIPTION OF THE DRAWINGS

The above and other objects, features and advantages of the present invention will become more apparent from the following description when taken into conjunction with accompanying drawings.

DETAILED DESCRIPTION OF THE PREFERRED EMBODIMENT

Figure 1:
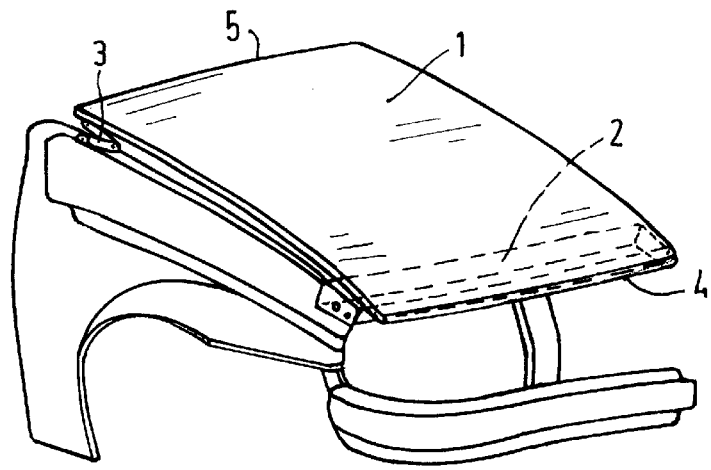
FIG. 1 is a perspective view of the pedestrian safety device in normal operation condition in accordance with the present invention.

A perspective view of the pedestrian safety device is shown in FIG. 1. The device consists of a hood 1, a pedestrian safety module 2 and a rear hinge 3. The safety module 2 is located beneath the hood's leading edge 4 and it behaves as a conventional latch platform in normal operation conditions. The rear hinge 3 is located at the hood's trailing edge 5, and also behaves in a conventional manner in normal operation conditions.

Figure 2:
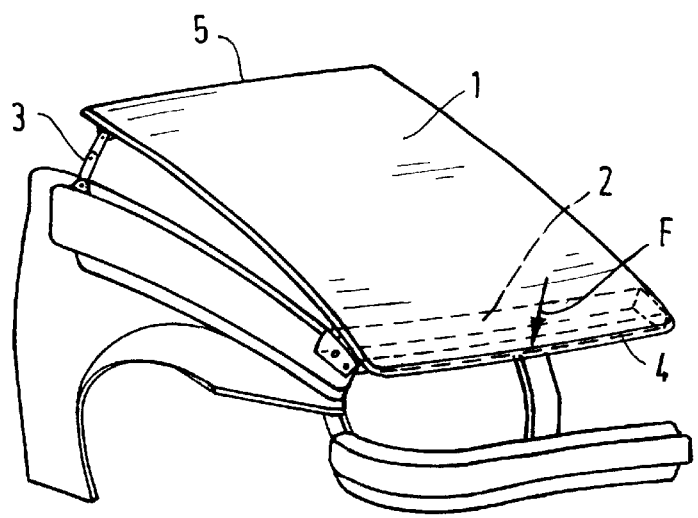
FIG. 2 is a perspective view of the released pedestrian safety device with deployed hood in accordance with the present invention.

FIG. 2 shows the pedestrian safety device in the deployed condition. During an impact between any position on the hood leading edge 4 and a pedestrian hip/upper leg, e.g. represented by force F, the impact energy rotates the front end of module 2, which in turn rotates the hood 1 about the module 2, and allows the hood leading edge 4 to progressively collapse. The rotational impulse of the hood 1 is also used to release the rear hinge assembly 3 to a safety operation mode, where the geometry of the hinge assembly 3 changes and the trailing edge 5 of the hood 1 can uplift, hence lifting the hood 1 away from the engine hardpoints. This results in a lower load on the pedestrian hip/upper leg and a reduction in head injuries.

Figure 3:
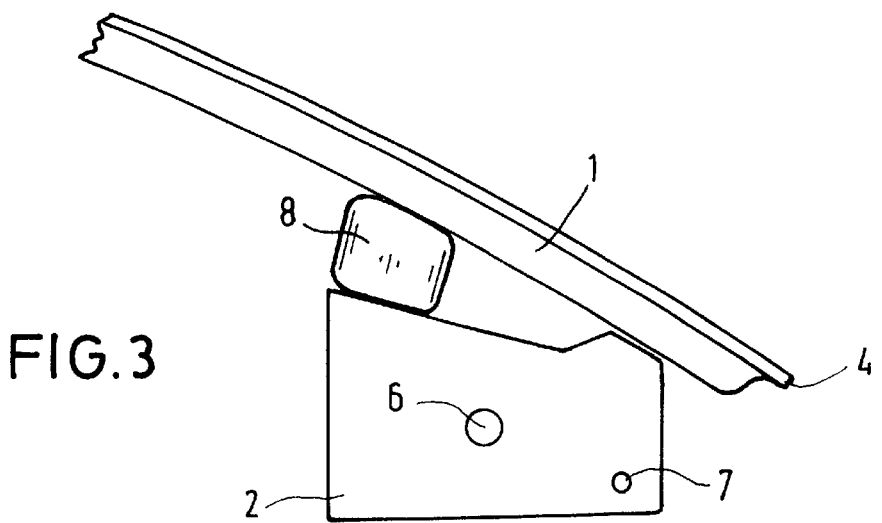
FIG. 3 is a cross-sectional view of the pedestrian safety module in normal operation conditions.

Normal operation condition details of the pedestrian safety module 2 are illustrated in the cross-sectional view of FIG. 3. The module 2 is attached to the body structure of the front end with a safety module pivot 6, located at the appropriate center of the module cross section. Rotation of the safety module 2 is restrained by a shear pin 7 or other structural means to prevent it from rotating and enable it to have a structural function in normal operating conditions. A rubber bump stop 8 is located towards the back edge of the module 2 and beneath the hood 1. A variation of this design may be incorporated into a Grille Opening Reinforcement assembly.

Figure 4:
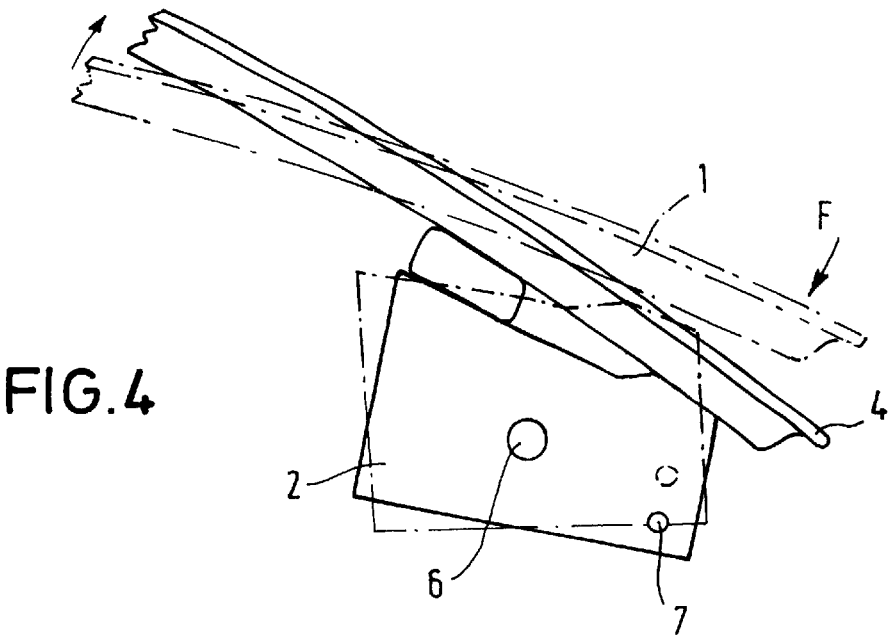
FIG. 4 is a cross-sectional view of the pedestrian safety module in deployed position.

FIG. 4 shows the pedestrian safety module in deployed condition. During a pedestrian impact on the leading edge 4 of the hood 1, represented by load F, a clockwise moment is created about the pivot 6 of the safety module 2. At a predetermined impact load the shear pin 7 fails and the module is free to rotate. Other structural connections between the module and the body front end structure may also be used to achieve the same operation. Alternatively, a Grille Opening Reinforcement may incorporate an upper member that can rotate in this manner. The rubber bump stops 8 transmit the rotation of the module 2 directly into the hood stiffeners and hence begin to rotate the hood also in a clockwise direction.

Figure 5:
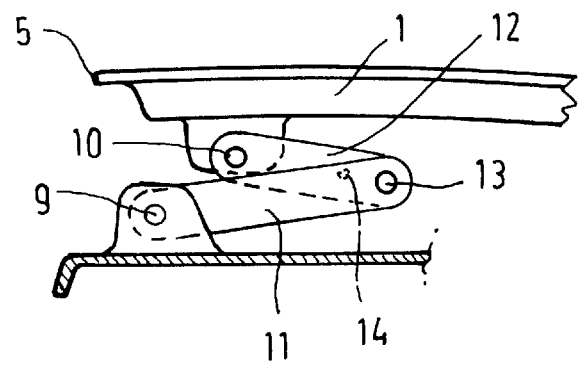
FIG. 5 is a cross-sectional view of the hinge assembly in normal operation conditions.

The rear hinge in normal operating condition is shown in FIG. 5. The hinge joints are arranged so that in normal operating mode the hood initially rotates around a first hinge pivot 9 attached to the body structure of the front end, and then, if desired for additional access, around a second hinge pivot 10, attached to the hood 1. First and second hinge pivots 9,10 are connected by a lower hinge bar 11 and an upper hinge bar 12, with both bars linked at a safety pivot 13. The safety pivot 13 is restrained by a shear pin 14, connecting lower hinge bar 11 and upper hinge bar 12, or other structural means to prevent the rear edge of the hood lifting upwards during normal operating conditions.

Figure 6:
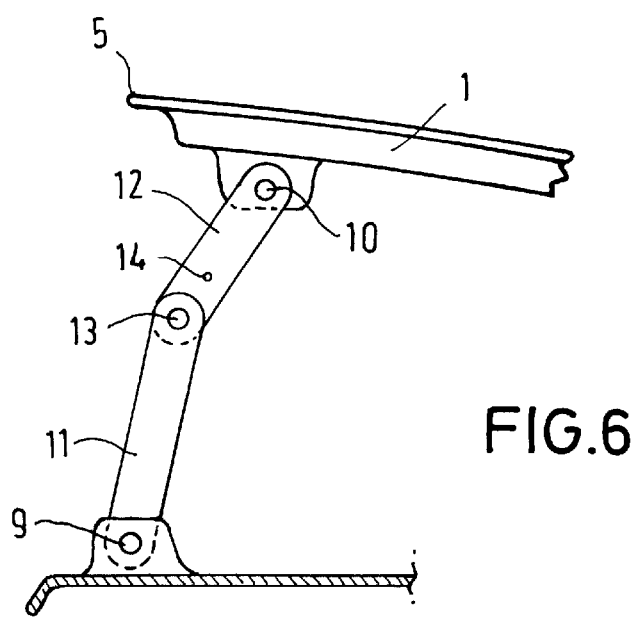
FIG. 6 is a cross-sectional view of the hinge assembly in deployed position.

The rear hinge assembly in deployed condition is illustrated in FIG. 6. The rotation of the hood 1, resulting from the pedestrian impact on the leading edge 4 of the hood 1 is transmitted to the rear hinge assembly via the hood inner sidemembers. This rotation loads the hinge assembly in the opposite direction to its normal operation. At a predetermined load the shear pin 14 fails and releases the safety pivot 13. The hinge assembly is then free to rotate simultaneously about the first and second hinge pivots 9, 10. The two hinge bars 11, 12 continue to rotate until the hinge bars are in line and then the upper hinge bar 12 toggles over center to reach a position, (characterized) in that both hinges bars 11, 12 are slightly angled with the angle in the opposite direction compared to the normal operation condition. This locks the hood 1 in its raised position, which is in the area of the rear hinges approximately 100 mm above its normal operation position.

What is claimed is:

1. A pedestrian safety device for an automotive vehicle having a body structure and a hood with a trailing edge and a leading edge, the safety device comprising:

at least one safety module mountable to the body structure beneath the hood adjacent the leading edge for rotation about a pivot axis extending transversely to the vehicle body structure, the safety module having a normal operating condition wherein the safety module restrains against downward movement of the leading edge, the safety module rotatable about the pivot axis to a deployed condition in response to application of a downward force on the hood, said rotation to the deployed condition permitting the hood to move to a raised position wherein the trailing edge is raised upwardly with respect to the body structure; and at least one hinge assembly connecting the body structure to the hood adjacent the trailing edge, the hinge assembly having a normal operating condition wherein the hood is rotatable about the hinge assembly to open the hood and a deployed condition wherein permitting the hood to move to the raised position.

2. The pedestrian safety device according to claim 1 wherein the safety module further comprises a member engaging the body structure to restrain the safety module against rotation away from the normal operating condition when the downward force is less than a predetermined level and permit rotation of the safety module to the deployed condition when the downward force exceeds the predetermined level.

3. The pedestrian safety device according to claim 1 wherein the member comprises a shear pin configured to fail when the downward force exceeds the predetermined level.

4. The pedestrian safety device according to claim 1 wherein the safety module comprises a bump stop disposed rearward of the pivot to contact an under surface of the hood.

5. The pedestrian safety device according to claim 1 wherein the safety module is configured to serve as a latch platform when in the normal operating condition.

6. The pedestrian safety device according to claim 1 wherein the hinge assembly comprises:

a lower hinge bar pivotally connected to the body structure;

an upper hinge bar pivotally connected to the hood; and a safety pivot connecting the lower and upper hinge bars, the lower and upper hinge bars pivoting together as a unit relative to at least one of the body structure and the hood when in the normal operating mode, and the lower and upper hinge bars pivoting relative to one another about the safety pivot to reach the deployed condition.

7. The pedestrian safety device according to claim 6 wherein the hinge assembly further comprises a member restraining the hinge bars in the normal operating condition when an upward load applied to the hinge assembly by the hood is less than a predetermined level and releasing the hinge bars to move to the deployed condition when the upward load exceeds the predetermined load.

8. The pedestrian safety device according to claim 7 wherein the member comprises a shear pin configured to fail when the upward load exceeds the predetermined level.

9. The pedestrian safety device according to claim 1 wherein the hinge assembly in the deployed condition locks the hood in the raised position.

10. A pedestrian safety device for an automotive vehicle having a body structure and a hood with a trailing edge and a leading edge, the safety device comprising:

at least one safety module mountable to the body structure beneath the hood adjacent the leading edge for rotation about a pivot axis extending transversely to the body structure, the safety module having a normal operating condition wherein the safety module restrains the hood against downward movement of the leading edge, the safety module rotatable about the pivot axis to a deployed condition by application of a downward force on the hood, said rotation to the deployed condition permitting the leading edge to move downwardly and the trailing edge to move upwardly; and at least one hinge assembly connectable to the body structure and to the hood adjacent the trailing edge, the hinge assembly having a normal operating condition wherein the hood is rotatable about the hinge assembly to open the hood and a deployed condition wherein the trailing edge is lifted upwardly in response to the movement of the safety module to the deployed condition.

11. The pedestrian safety device according to claim 10 wherein the hinge assembly comprises:
- a lower hinge bar pivotally connected to the body structure;
- an upper hinge bar pivotally connected to the hood; and
- a safety pivot connecting the lower and upper hinge bars, the lower and upper hinge bars pivoting together as a unit relative to at least one of the body structure and the hood when in the normal operating mode, and the lower and upper hinge bars pivoting relative to one another about the safety pivot to reach the deployed condition.

12. The pedestrian safety device according to claim 11 wherein the hinge assembly further comprises a member restraining the hinge bars in the normal operating condition when an upward load applied to the hinge assembly by the hood is less than a predetermined level and releasing the hinge assembly to move to the deployed condition when the upward load exceeds the predetermined load.

13. The pedestrian safety device according to claim 12 wherein the member comprises a shear pin configured to fail when the upward load exceeds the predetermined level.

14. The pedestrian safety device according to claim 10 wherein the safety module further comprises a member engaging the body structure to restrain the safety module against rotation away from the normal operating condition when the downward force is less than a predetermined level and permit rotation of the safety module to the deployed condition when the downward force exceeds the predetermined level.

15. The pedestrian safety device according to claim 14 wherein the member comprises a shear pin configured to fail when the downward force exceeds the predetermined level.

16. The pedestrian safety device according to claim 10 wherein the safety module comprises a bump stop disposed rearward of the pivot to contact an under surface of the hood.

17. The pedestrian safety device according to claim 10 wherein the safety module is configured to serve as a latch platform when in the normal operating condition.

18. A pedestrian safety device for an automotive vehicle having a body structure and a hood with a trailing edge and a leading edge, the safety device comprising:
- at least one safety module mountable to the body structure beneath the hood adjacent the leading edge for rotation about a pivot axis located rearward of the leading edge and extending transversely to the vehicle body structure, the safety module blocking downward movement of the leading edge when a downward force applied to the hood is less than a predetermined level, the safety module rotatable about the pivot axis when the downward force exceed the predetermined level, said rotation of the safety module permitting the hood to rotate about the pivot axis to a raised position wherein the trailing edge is lifted upwardly with respect to the body structure; and
- at least one hinge assembly connectable to the body structure and to the hood adjacent the trailing edge, the hinge assembly having a normal operating condition wherein the hood is rotatable about the hinge assembly to raise the leading edge, the hinge assembly movable to a deployed condition wherein the trailing edge is lifted upwardly relative to the body structure.

* * * * *